UNITED STATES PATENT OFFICE.

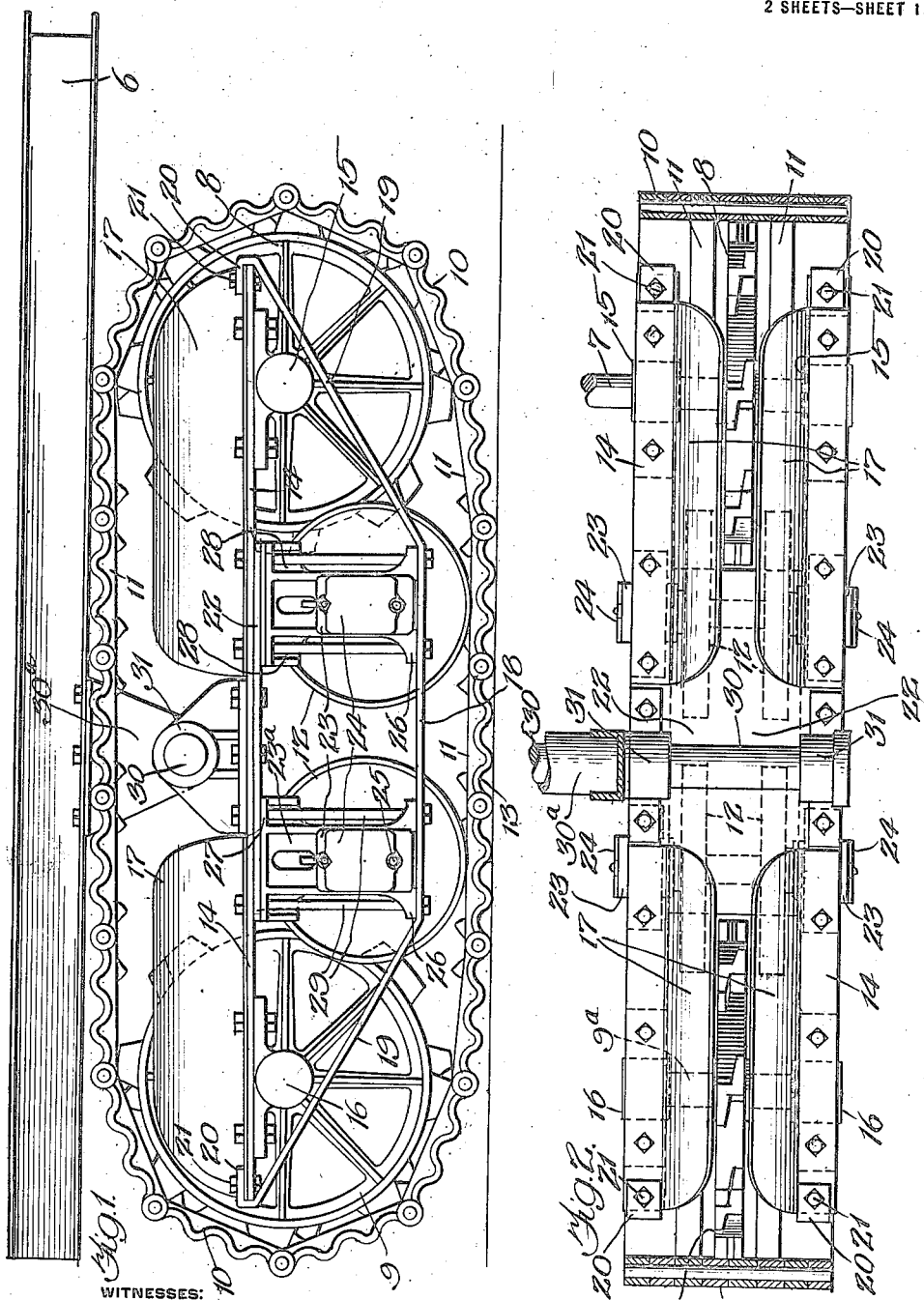

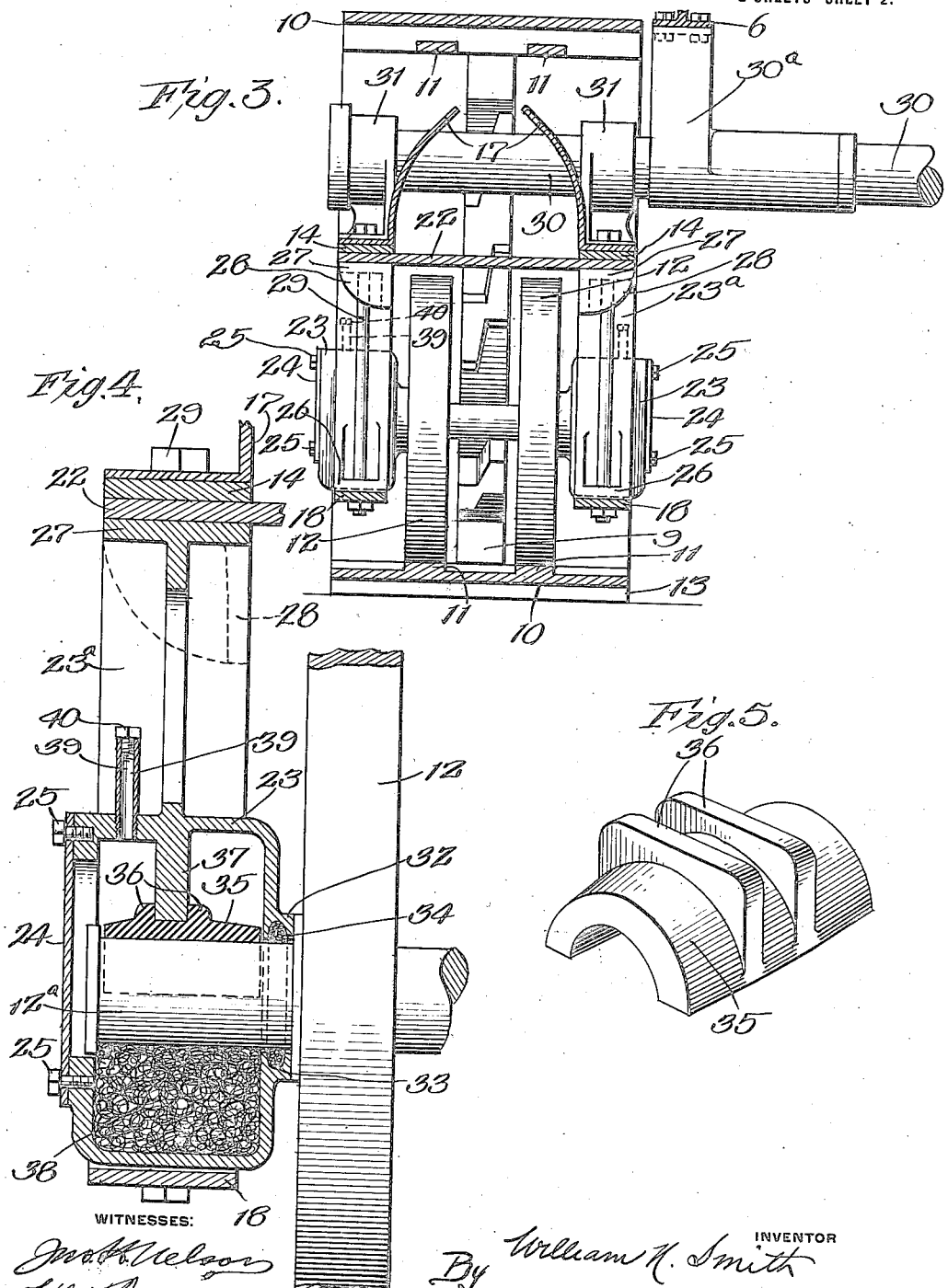

WILLIAM N. SMITH, OF CHICAGO, ILLINOIS.

TRACTOR-TRUCK.

1,222,335.　　　Specification of Letters Patent.　　Patented Apr. 10, 1917.

Application filed June 5, 1916. Serial No. 101,679.

*To all whom it may concern:*

Be it known that I, WILLIAM N. SMITH, a citizen of the United States, residing at Chicago, in the county of Cook and State of Illinois, have invented certain new and useful Improvements in Tractor-Trucks, of which the following is a full, clear, and exact specification, such as will enable others skilled in the art to make and use the same, reference being had to the accompanying drawings, forming a part of this specification.

My invention relates to tractor trucks of the endless chain tread type, and has for one of its main objects to improve the construction and increase the efficiency and utility of trucks of this type. Another object is to provide a simple, compact, and durable structure capable of being readily and cheaply manufactured and of easy assemblage and application to the tractor frame. A further object is to provide a truck frame composed of but a few easily fabricated parts rigidly associated together with centrally disposed bearing wheel journal boxes, and having cantaliver ends projecting from the journal boxes to support the sprocket and idler wheels, and wherein each journal box is arranged independently of the other and capable of being readily removed from the truck frame in the event of needed repair or replacement and without dismantling the frame and placing the machine out of service. My invention also contemplates the provision of means designed to afford the truck maximum immunity against the cutting action of sand and dust, especially in relation to moving parts and their bearings. This feature is important in a structure using bearing wheels whose axles are necessarily close to the ground being worked and consequently subject to a maximum degree of cutting action from the sand and fine dust raised during tractor movement.

These, together with such other objects as may hereinafter appear, or are incident to my invention, I attain by means of the construction illustrated in preferred form in the accompanying drawings, wherein:—

Figure 1 is a side elevation of a tractor truck embodying my invention and improvements;

Fig. 2 is a top plan view of the truck proper, with the upper stretch of the chain tread removed;

Figs. 3 and 4 represent vertical sectional views taken through the truck and a weight bearing wheel journal box, respectively; and Fig. 5 is a view in perspective of the journal box bearing.

Referring to the drawings, the numeral 6 indicates the tractor frame illustrated in a conventional manner, 7 the driving axle and 8 its driving sprocket wheel, 9 the idler wheel, and 10 designates the endless chain tread passed around the wheels 8 and 9 and provided with tracks 11 for the weight bearing wheels 12 to roll over when traveling upon the lower stretch 13 of the endless chain tread. These bearing wheels are preferably arranged in pairs intermediately of the sprocket wheels and on both sides of the line of sprocket wheel travel to prevent side buckling or canting of the tread members when negotiating uneven ground.

As shown in the drawings, the truck frame proper is composed of a few associated parts formed from commercially shaped iron, and in which the only castings employed are the journal boxes and bearings for the moving parts, the whole being united in a rigid structure, at the same time permitting removal and replacement of any casting when necessary.

Composing this frame are the two top bars 14 extending longitudinally on both sides of the wheels 8 and 9, and secured thereto adjacent their rear and front ends are hanger bearing brackets 15, 15 and 16, 16, respectively, for the axle 7 of the driving sprocket wheel 8 and the axle 9ª of the idler sprocket wheel 9. These top bars 14, in the proximity of these wheels and at each side thereof, are flanged upwardly and inwardly toward the wheel to provide the dust guards 17.

Coöperating with and extending below each of these top bars 14 is an arched base bar whose central portion 18 parallels the corresponding portion of the top bar and whose upwardly inclined end portions 19 are terminally bent at 20 and connected with the ends of the top bar by a bolt element 21.

Each pair of top and arched base bars form a side frame unit, and these are cross-connected by the solid plate 22 extending laterally across and secured to the central portions of the top bars 14, as in the manner shown in Figs. 1 and 2 of the drawings. The side frame units centrally carry the spaced journal boxes 23, there being four such boxes shown in the drawings and each side frame unit provided with two of them, the backs of the front and rear pairs facing each other in order to receive the axles of the front and rear pairs of weight bearing wheels 12, (Fig. 3).

The journal boxes 23 are each provided with a front cover plate 24 secured thereto by the screws 25, affording access to the box interior when packing is to be renewed or the like, and with the side bottom ears 26. The body portion of the box is formed with an upper extension 23ª terminating in a top flange 27 disposed approximately in the same plane as that of the bearing wheel periphery, the lateral plate 22 being preferably carried intermediate the top bars 14 of the frame and top flanges 27 of the journal boxes and above the bearing wheels 12. This upper box extension 23ª is formed with side ears 28 cast with the top flange. The numeral 29, 29, designates securing bolt elements passing vertically through the frame members 14, 18, and 22 and the ears and top flange 26 and 27, to rigidly secure the boxes to the frame members by which they are removably carried. 30 indicates a weight carrying shaft extending through a bracket 30ª secured to and depending from the tractor frame 6 and through the shaft bracket bearings 31, 31, mounted in transverse alinement upon the top of the truck frame intermediate the front and rear pairs of dust guards 17 and whose axial line is slightly in advance of a vertical line drawn equidistant from the axial lines of the pairs of bearing wheels 12. It will be apparent from the description thus far made that the central portion of the truck frame approximates a skeleton rectangular conformation, by means of which the weight of the tractor is transmitted through the bearing wheels to the lower stretch of the chain tread 10, and having cantaliver or oppositely projecting ends in which the sprocket wheels 8 and 9 are supported.

Heretofore solid cast trucks having bearings formed in the web for the weight carrying wheel axles have been employed, but the sand and fine dust arising with the machine in service has rapidly cut out the bearings and seriously impaired the efficiency of the tractor. This I aim to overcome in the provision of my improved journal box, whose back wall is formed with a hub portion 32 having an annular recess 33 provided with a felt packing 34 fitting about the axle 12ª of the bearing wheels to exclude dust and sand from the box and more particularly the bearing member or brass 35. This latter member is positioned in the box to straddle the axle 12ª and is formed on its upper face with parallel ribs 36 engaged by the retaining and locking flange 37 depending from the top wall of the box. The lower portion of the box may be provided with any desired lubricating agent, such as the oily waste indicated in Fig. 4 by the numeral 38. With the front cover plate positioned as shown in this figure it will be obvious that any possibility of dust and sand entering the box interior is reduced to an absolute minimum. An oil inlet pipe 39 may be tapped into the top of the box if desired, the inlet being normally closed by a stepper 40.

Other advantages will readily present themselves to those skilled in the art. I do not desire to be understood as limiting myself to the details of construction and arrangement shown as it is manifest that variations and modifications may be made in the features of construction and arrangement in the adaption of the device to various conditions of use without departing from the spirit and scope of my invention and improvements. I therefore reserve the right to all such variations and modifications as properly fall within the scope of my invention and the terms of the following claims.

What I claim is:—

1. In a tractor, the combination of a pair of sprocket wheels, an endless chain tread passed about said wheels, a supporting truck for said wheels, embodying connected side sections at each side of the wheels, each section comprising frame members centrally spaced apart intermediately between the wheels, a weight bearing wheel adapted to roll on the lower stretch of said endless chain tread, and a self-contained journal box fixedly associated with and intermediately between the frame members in each of said sections, said journal boxes formed with a closed walled body portion internally provided with bearing members for the axle of the bearing wheel.

2. In a tractor, the combination of a pair of sprocket wheels, an endless chain tread passed about said wheels, a supporting truck for said wheels comprising side sections disposed at the sides of said wheels, each section embodying an upper frame member and a lower frame member terminally connected with said upper member and centrally spaced therefrom, self-contained journal boxes in said sections and serving to space the upper and lower frame members in each section, weight bearing wheels adapted to roll on the lower stretch of said endless chain tread, said journal boxes interiorly provided with bearing members for said weight bearing wheels, and bolt means for securing said boxes to said frame members.

3. In a tractor, the combination of a frame provided with a driving axle, a sprocket wheel on said axle and an idler wheel, an endless chain tread passed about said wheels and having an inner track portion, a truck having a main body portion between the wheels and forked cantaliver ends in which the wheels are journaled, said main body portion pivotally mounted in the frame and said truck comprising horizontal top and terminally arched base members centrally spaced apart to form said main body portion, self-contained journal boxes in said main body portion and disposed intermediately between said top and base members, bearing wheels having their axles in said journal boxes and bearing on the track portion in the lower stretch of the endless chain tread, and fastening elements extending through said journal boxes into said main body portion.

In testimony whereof I have hereunto signed my name and affixed my signature.

WILLIAM N. SMITH.